Figure 1:
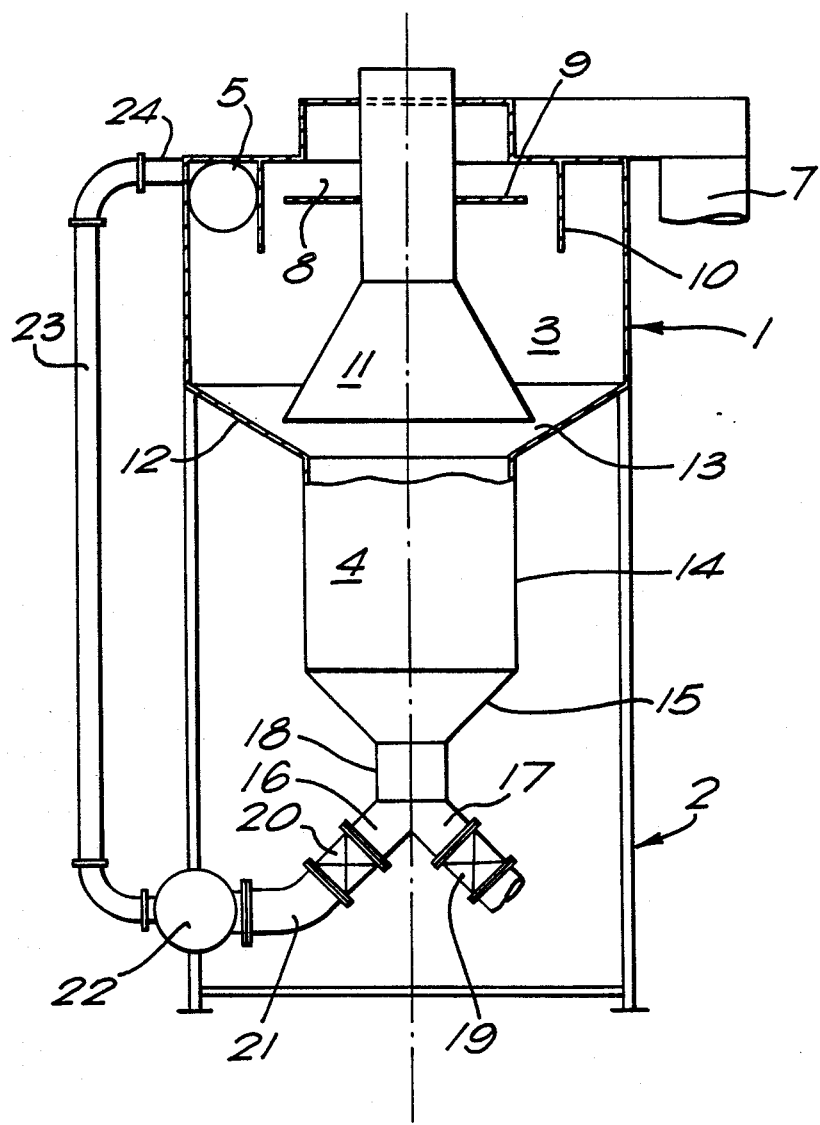

United States Patent [19]

Lamb

[11] Patent Number: 4,903,899
[45] Date of Patent: Feb. 27, 1990

[54] SEPARATOR

[75] Inventor: Timothy J. Lamb, Clevedon, United Kingdom

[73] Assignee: Hydro International Limited, England

[21] Appl. No.: 284,348

[22] Filed: Dec. 14, 1988

[30] Foreign Application Priority Data

Dec. 14, 1987 [GB] United Kingdom ............... 8729155

[51] Int. Cl.⁴ ............................................. B02C 23/36
[52] U.S. Cl. ........................................ 241/14; 241/20; 241/21; 241/24; 241/46 R; 241/79.1
[58] Field of Search ................... 241/79.1, 14, 21, 19, 241/24, 46 R, 76, 77, 78, 20

[56] References Cited

U.S. PATENT DOCUMENTS

| | | | |
|---|---|---|---|
| 1,781,435 | 11/1930 | Carper | 241/46 R |
| 3,480,543 | 11/1969 | Hildebrand | 241/46 R X |
| 4,269,808 | 5/1981 | Kawabata | 241/46 R X |

FOREIGN PATENT DOCUMENTS 2082941 8/1981 United Kingdom .
2158741 5/1984 United Kingdom .

Primary Examiner—Mark Rosenbaum
Attorney, Agent, or Firm—Larson and Taylor

[57] ABSTRACT

A method for separating a first, relatively dense and hard component of a liquid mixture from a second, less dense and relatively soft component of the mixture. The method comprises introducing the liquid mixture into a settlement vessel (3); abstracting the settled solids from the settlement vessel (3) and passing the abstracted, settled solids through a shearing means (22); and returning the abstracted, sheared solids to the settlement vessel (3) thereby to permit the relatively hard component of the liquid mixture to settle and separate from the relatively soft component. An apparatus for separating a first, relatively dense and hard component of a liquid mixture from a second, less dense and relatively soft component of the mixture.

8 Claims, 2 Drawing Sheets

SEPARATOR

This invention relates to an apparatus for separating a first relatively hard component of a fluid mixture from a second, relatively soft component of the mixture and is more particularly, but not exclusively, concerned with an apparatus for separating a grit component from an organic component of sewage.

In the processing of sewage, it is important to remove sand and grit in a relatively clean and dry condition as the sewage enters a treatment works or pumping station, while passing organic matter on into the works with the liquid for treatment. If the grit is not trapped it tends to settle out in the sedimentation and sludge treatment tanks and may clog the bottom of hoppers and sludge outlets. At present, various relatively complex grit traps are available for grit removal. One such grit trap, which is designed to remove grit from sewage as it enters a treatment works or pumping station, comprises a hopper bottomed tank which may be positioned immediately adjacent to the main inlet channel of the treatment works. Constant velocity conditions in the tank are achieved by the use of paddles rotating in the same direction as the sewage. During normal operation, sewage passes in and out of the grit trap chamber whilst the paddles are continually rotating. During this period, grit separation occurs, the grit and a proportion of organic matter sinking to the bottom of the trap. Periodically, pressurised water and compressed air is used to back-wash the grit. Air and water passing up through the detritus cleans the grit to some extent and lifts a proportion of the organic matter trapped with the grit. The grit at the base of the trap is then sucked up through a central pipe communicating with the base region of the trap.

Typically, the grit fraction removed from sewage contains about 25% organic material. This can lead to problems in disposal of the grit and may necessitate a further grit cleaning step.

According to a first aspect of the present invention there is provided a method for separating a first, relatively hard component of a fluid mixture from a second, relatively soft component of the mixture, the method comprising:

introducing the fluid mixture into a settlement vessel having a cylindrical wall, a base, a solids collection region disposed centrally of the base and an outlet means disposed in an upper region of the vessel and permitting settleable solids to settle under the action of gravity in the settlement vessel;

abstracting the settled solids from the settlement vessel and passing the abstracted, settled solids through a shearing means to alter the settlement characteristics of the relatively soft component;

returning the abstracted, sheared solids to the settlement vessel, there being a rotational flow of fluid in the vessel of sufficiently low energy to permit the relatively hard component of the fluid mixture to settle under gravity on the base and be swept toward the solids collection region but sufficiently high to maintain the relatively soft component whose settlement characteristics have been altered in suspension so that the soft component may be removed from the upper region of the vessel via the outlet means.

After introduction of the fluid mixture into the settlement vessel, the relatively hard component, together with a proportion of the relatively soft component, will settle at a lower end region of the settlement vessel. This settling step is referred to below as the first settlement step. Following abstraction of the settled solids from the vessel, the shearing means shears the settled solids, particularly the relatively soft component, thereby altering the settlement characteristics of the relatively soft component. By "settlement characteristics" herein is meant the velocity at which a particle settles in a body of fluid. This is dictated by the specific gravity of the particle and the 3-dimensional shape of the particle. For spherical particles, for a given material, the settling velocity is proportional to the square of the diameter of the particle (Stoke's law). However, where the particles agglomerate or are nonspherical, the settlement velocity will generally be less. It can be seen that, in any settlement tank, particles of higher specific gravity will tend to settle more quickly. Moreover, particles having relatively large diameters will also tend to settle more quickly. By shearing the material accumulated in the settlement vessel, which will predominantly alter the nature of the soft component rather than the hard component, the settling velocity of the soft component will be reduced to enable more thorough separation of the hard fraction from the soft fraction to occur. On returning the abstracted, sheared solids into the settlement vessel, the relatively hard component is separable from the relatively soft component by virtue of the different settlement characteristics of the relatively hard component and the relatively soft component. This settlement of the hard component from the soft component is referred to below as the second settlement step.

In the first settlement step, as has been stated, the relatively hard component and a proportion of the relatively soft component are settled. Settlement may be enhanced by introducing, via a tangential inlet, the fluid mixture into the settlement vessel to induce or enhance a rotational flow in the vessel. In this first settlement step, a proportion of the relatively less dense and soft component (which is inherently less settleable than the hard component) will also be removed via an outlet from an upper end of the settlement vessel.

In the second settlement step, the relatively soft component which has been sheared and thus has had its settlement characteristics altered, will be less liable to settle than before and following introduction into the settlement vessel tends to be removed from the settlement vessel at the upper end thereof. To enhance separation in the second settlement step, it may be desirable to increase the rotational flow in the settlement vessel which will lead to enhanced separation of the relatively hard component from the relatively soft component. Alternatively, it can be arranged that the settled solids are re-introduced into the settlement vessel at times set to coincide with peak flows into the settlement vessel when rotational flow in the settlement vessel will be at a maximum. This can be achieved by manually controlling reintroduction into the settlement vessel or, alternatively, providing control means for sensing increased flow in the vessel and activating circulation of the settled solids from the settlement vessel through the shearing means and back into the settlement vessel.

Alternatively, or in addition, an energizing means may be provided to increase the rotational energy of the circulating fluid in the vessel (see our British published application, GB-2158741).

The method of the present invention solves the problem encountered in grit separation which may best be explained by reference to the example of a pea, which has broadly similar settlement characteristics to grit. The shearing means will break up the pea into a pulp, which will settle less rapidly than the original pea. It will thus tend not to settle with the grit in the second settlement step but will be removed from the settlement vessel via the inlet in the upper end thereof.

According to a second aspect of the present invention there is provided an apparatus for separating a first, hard component of a fluid mixture from a second, relatively soft component of the mixture, the apparatus comprising:

a settlement vessel having a cylindrical wall, a base, a solids collection region centrally disposed of the base and an outlet means disposed in an upper region of the vessel;

a circulation means for circulating said settled solids from the collection region through a shearing means and returning the circulated solids to the settlement vessel.

The settlement vessel may include a first, tangential inlet for introducing the fluid mixture into the settlement vessel in a manner to create or enhance a low energy rotational motion in the fluid mixture in the settlement vessel.

Preferably, a first outlet is provided in the collection region which outlet communicates with the shearing means.

The shearing means may comprise a disintegrator pump of the submersible type which is capable of pumping waste water containing a relatively high concentration of solids, without the necessity for screen protection. The shearing means disintegrates the relatively soft component and may, to a certain extent, also disintegrate the relatively hard component. However, the settlement characteristics of the hard component will not be altered significantly by shearing whereas the settlement characteristics of the soft component will, in contrast, be substantially altered. Accordingly, when the solids are reintroduced into the settlement vessel, the relatively hard component separates from the sheared, relatively soft component, with the soft component being removed from the outlet in the upper end of the settlement vessel.

The settlement vessel may be a part of the separator disclosed in GB-2082941 or GB-2158741, which separator has been suitably "de-tuned" (i.e. its separating efficiency is reduced) so that, in the first settlement step, the solids which settle include substantially all of the relatively dense, hard component together with only that part of the soft component which is either entrained with the hard component or which has settlement characteristics similar to those of the hard component. "De-tuning" of the separator of GB-2082941 or GB-2158741 may be achieved by altering (increasing) the rate of flow of the fluid mixture into the vessel or by altering the parameters of the vessel itself such that, at low flow rates into the vessel, the bulk of the solids, including the less dense material, is carried out through the outlet in the upper end of the vessel.

In embodiments of this invention where the settlement vessel is provided with a tangential inlet through which the fluid mixture is introduced, it is preferred that the rate of flow into the settlement vessel is relatively low such that the rotational motion induced is a low energy flow, in which gravitational forces acting on the particles of the fluid mixture predominate over centrifugal forces, rather than a whirlpool like flow in which solids are effectively spun out of the mixture.

The collection region of the apparatus of the present invention may be provided with a second outlet, preferably controlled by a valve, from which cleaned grit may be removed after the second settlement step. Although it is presently envisaged that only two discrete settlement steps will be required, it is considered within the scope of the present invention to provide third and further settlement steps following further recirculation of accumulated material from the settlement vessel through the shearing means. Thus a grit particle may make several passes through the shearing means before it is eventually removed from the settlement vessel.

Figure 2:
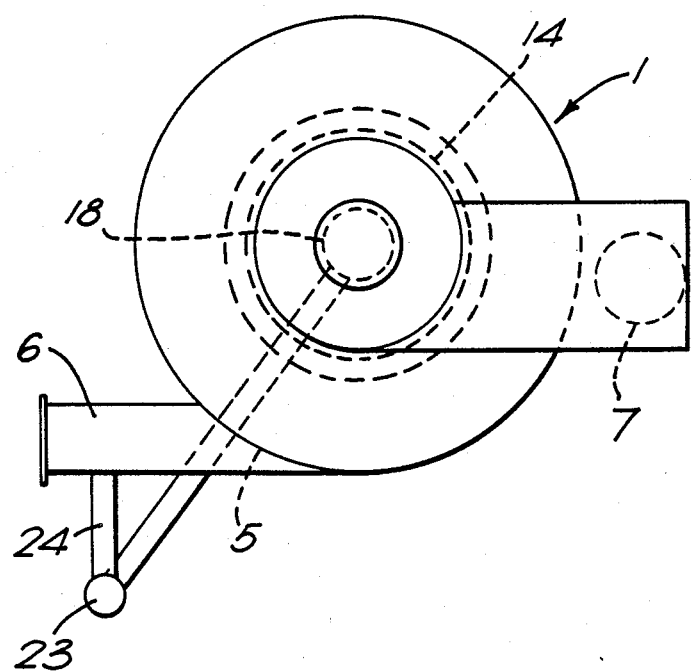

For a better understanding of the present invention and to show how it may be carried into effect, reference will now be made, by way of example, to the accompanying drawings in which:

FIG. 1 shows one embodiment of an apparatus in accordance with the present invention; and FIG. 2 is a top view of the separator of FIG. 1.

The apparatus illustrated in the Figures comprises a cylindrical separator 1 which is supported on a framework 2. The separator includes an upper, separating chamber 3 and a lower, solids collection chamber 4. Communicating with the separating chamber 3 is an inlet 5, leading from a primary inlet pipe 6, and an outlet 7. The inlet 5 is directed tangentially into the upper chamber 3 so as to promote a rotational flow therein. The outlet 7 communicates with an annular slot 8 in the upper end of the chamber 3. The annular slot 8 is defined between a baffle 9 and an annular dip plate 10. A flow modifying member 11, in the shape of a cone, is arranged in the upper chamber 3 to stabilise the rotational flow therein.

The upper chamber 3 of the separator 1 has a gently sloping base 12 leading to the lower chamber 4. The sloping base 12 and the foot of the flow modifying member 11 between them define an annular passage 13 through which settled solids are urged by the gently rotating fluid.

The lower chamber 4 or hopper is generally cylindrical with vertical walls 14 leading to a sloping base 15. Two outlets 16, 17 communicate with the base 15 of the lower chamber 4 via a short passage 18, one of the outlets 17 being controlled by a valve 19 for removal of accumulated solids in the lower chamber 4, the other outlet 16 communicating, via a valve 20, with a conduit 21 which leads to a shearing means in the form of a disintegrator pump 22. A suitable disintegrator pump is that available from Jones and Attwood Limited, Stourbridge, West Midlands, England, under the name J & A Landustrie Submersible Disintegrator Pump. The disintegrator pump 22 communicates with the outlet 5 in the upper chamber 3 via further conduits 23, 24, and the primary inlet pipe 6.

In operation as part of a sewage system, the apparatus shown in the drawings would receive the whole flow of sewage to a sewage treatment plant. The sewage comprises not only an organic fraction but also grit, and is passed into the upper chamber 3 via the primary inlet pipe 6 and the inlet 5. This creates a gentle rotational flow in the upper chamber 3 in which gravitational forces on particles of the sewage tend to predominate over centrifugal forces. In the separator 1, substantially all material having a settling velocity above a given value will be separated out of the flow and will fall into the collection chamber 4. The remainder of the material will pass with the main flow through the outlet 7 to the treatment works. In practice, the system is designed so that the flow rate into the separator 1 is such that, in a first settlement step, substantially all of the relatively dense, hard material settles whilst the majority of the soft, organic fraction is carried out through the outlet 7. The grit fraction, appreciably contaminated with organic material, falls to the base 12 of the upper chamber 3 and is gently eased, by the rotational flow, across the base 12, through the annular slot 13 and into the lower, collection chamber 4 in which the contaminated grit accumulates.

At selected moments, such as when an appreciable amount of solids has accumulated, the disintegrator pump 22 is activated and the valve 20 opened to permit the accumulated solids in the lower chamber 4, together with a volume of liquid, to be sucked through the outlet 16, into the inlet of the pump 22 and through the pump thereby to shear the solids. The soft organic component is thereby substantially broken up, effectively altering the settlement characteristics of the organic settled solids. The sheared solids are then pumped through conduits 23 and 24 and the primary inlet 6 and returned to the upper chamber 3. The solids are again allowed to settle in the upper chamber 3 but the grit, primarily, will be deposited, as described above, by virtue of its relatively high density and relative ease of settlement. At appropriate times, the cleaned grit can be removed through the outlet 17 for disposal. The sheared organic fraction is, in contrast, removed with the main flow via the outlet 7. In experimental tests, operation of a method in accordance with the present invention has yielded grit having an organic content of only 5%, which is very clean by current standards.

In order to enhance separation at this second settlement stage, the pump 22 may be activated to coincide with peak rates of flow into the upper chamber 3 via the inlet 5. Such peak rates of flow may occur at the breakfast and early evening times of the day when the use of water is at a maximum. The higher rates of flow provide a higher efficiency of separation of the grit fraction from the organic fraction.

I claim:

1. A method for separating a first, relatively hard component of a liquid mixture from a second, relatively soft component of the mixture, the method comprising:
   introducing the liquid mixture into a settlement vessel having a cylindrical wall, a base, a solids collection region centrally disposed of the base and an outlet means disposed in an upper region of the vessel and permitting settleable solids to settle under the action of gravity in the settlement vessel;
   abstracting the settled solids from the settlement vessel and passing the abstracted, settled solids through a shearing means to alter the settlement characteristics of the relatively soft component;
   returning the abstracted, sheared solids to the settlement vessel, there being a rotational flow of liquid in the vessel of sufficiently low energy to permit the relatively hard component of the liquid mixture to settle under gravity on the base and be swept toward the solids collection region but sufficiently high to maintain the relatively soft component whose settlement characteristics have been altered in suspension so that the soft component may be removed from the upper region of the vessel via the outlet means.

2. A method according to claim 1, wherein the liquid mixture is introduced into the settlement vessel via a tangential inlet to induce or enhance a rotational flow in the vessel.

3. A method according to claim 1 wherein, when the abstracted, sheared solids is returned to the settlement vessel, the rotational flow of the liquid in the settlement vessel is increased thereby to enhance separation of the relatively hard component from the relatively soft component.

4. A method according to claim 3, wherein the abstracted, sheared solids are re-introduced into the settlement vessel at times set to coincide with peak flows into the settlement vessel is at a maximum.

5. An apparatus for separating a first, hard component of a liquid mixture from a second, relatively soft component of the mixture, the apparatus comprising:
   a settlement vessel having a cylindrical wall, a base, a solids collection region centrally disposed of the base for collection of settleable solids in the liquid mixture, a first, tangential inlet for introducing the liquid mixture into the settlement vessel in a manner to create or enhance a low energy rotational motion in the liquid mixture in the settlement vessel and an outlet means disposed in an upper region of the vessel;
   a circulation means; and
   a shearing means through which the settled solids from the collection region is circulated to alter the settlement characteristics of the relatively soft material before being returned to the settlement vessel.

6. An apparatus according to claim 5, wherein a first outlet is provided in the collection region which outlet communicates with the shearing means.

7. An apparatus according to claim 5, wherein the shearing means comprises a submersible disintegrator pump.

8. An apparatus according to claim 5, wherein the collection region is provided with a second outlet from which cleaned grit may be removed.

* * * * *